PROCESS FOR MANUFACTURE OF THIN FILMS

Original Filed June 19, 1953 4 Sheets-Sheet 1

The Inventor:
Max Auwärter

PROCESS FOR MANUFACTURE OF THIN FILMS

Original Filed June 19, 1953 4 Sheets-Sheet 2

The Inventor:
Max Auwarter

PROCESS FOR MANUFACTURE OF THIN FILMS

Original Filed June 19, 1953 4 Sheets-Sheet 3

The Inventor:
Max Auwärter

PROCESS FOR MANUFACTURE OF THIN FILMS

Original Filed June 19, 1953 4 Sheets-Sheet 4

The Inventor:
Max Auwarter

United States Patent Office

Re. 26,857
Reissued Apr. 14, 1970

26,857

PROCESS FOR MANUFACTURE OF THIN FILMS

Max Auwarter, Balzers, Liechtenstein, by Optical Coating Laboratory, Inc., Santa Rosa, Calif., a corporation of California, assignee Original No. 2,920,002, dated Jan. 5, 1960, Ser. No. 362,792, June 19, 1953. Application for reissue Jan. 6, 1969, Ser. No. 805,388
Int. Cl. B44d *5/06;* C03c *17/22*
U.S. Cl. 117—33.3 12 Claims

Matter enclosed in heavy brackets [ ] appears in the original patent but forms no part of this reissue specification; matter printed in italics indicates the additions made by reissue.

*ABSTRACT OF THE DISCLOSURE*

*Process for the deposition of mechanically and chemically resistant, substantially absorption-free light-transparent thin films composed substantially completely of a saturated metallic compound on a carrier, comprising enriching the atmosphere of a vaporization chamber with a reactive gas whereby said reactive gas is contained in substantially higher proportion than in the normal atmosphere, vaporizing a substance selected from the group consisting of a vaporizable metal compound, the thin film of which is mechanically and chemically resistant, substantially absorption-free and light-transparent and a mixture of such compound with vaporizable free metal of the type in the compound in the enriched atmosphere and under a reduced pressure below that which leads to a substantial decrease in the hardness of the film, and effecting the condensation of the thus formed vapor on the carrier to thereby form a thin film of substantially completely saturated metallic compound on said carrier.*

The present invention relates to the production of thin films from metallic compounds by evaporation at low pressures.

It is known to produce thin films from metallic compounds by evaporation in vacuo and condensation of the vapor on carriers or substrates. It is also known to produce thin films by placing the selected metal on a base or carrier and by subsequently heating the metallic mirror including the base in an atmosphere containing a reactive gas, whereby the desired compound is formed. Such process is particularly suitable for the production of oxide films, the metal films placed on the base being heated in an oxidizing atmosphere. In accordance with another known process, the oxidation is carried out by means of oxygen ions produced in an electric vacuum discharge (glow discharge, electron bombardment). It is also known to oxidize the metallic films electrolytically.

It has also long been known to produce films of metallic compounds by cathodic sputtering of the metals in an atmosphere of reactive gas, e.g., oxide films by cathodic sputtering of metals in oxygen, sulphide films by cathodic sputtering in hydrogen sulphide, nitride films by sputtering in nitrogen, and so on. By such processes, the molecules of the reactive gas are activated in the electric discharge so that they can react chemically with the metals. This process has the great advantage that the compound formation takes place while the film is deposited, so that only one process step is required. Cerium oxide films, for example, can be produced directly in this way from cerium as starting material.

The first-mentioned process of direct vaporization of metallic compounds in a high vacuum has the disadvantage that the condensate for the most part does not correspond to the vaporized compound as a thermal disproportioning of the components of the vaporized compounds occurs during the vaporization at a high temperature. In particular, on vacuum evaporation of saturated compounds, unsaturated compounds are almost always obtained, or a mixture of saturated and unsaturated compounds. This often presents a serious disadvantage in the production of thin films for optical purposes since films of non-saturated compounds show optical absorption. This is particularly so in films from highly refractive substances, as experience has shown. It is, however, necessary to produce adherent, resistant and substantially absorption-free films from highly refractive substances for several very important new fields of application, such as double-film reflection reduction, multi-film interference filters and for glass jewelry with interference iridescence. Most hitherto available films made from highly refractive materials, for example, the heretofore most widely used zinc sulphite films, are so soft that objects coated with the films have to be protected under glass or else used only where they can be handled with extreme care.

The processes with subsequent compound formation, in particular the oxidation of metallic films by subsequent tempering, and cathodic sputtering, have the disadvantage that they are extraordinarily time-consuming and that the objects to be coated must frequently be heated to unpermissibly high temperatures, of the order of several hundred degrees centigrade. For example, a thorough oxidation of a single $\lambda/4$ film of titanium in air, at atmospheric pressure and at 300° C. requires at least 30 minutes, and at least as much time is required for the production of such film by cathodic sputtering. It is therefore not economically feasible to produce in this way multi-film systems consisting, for instance, of 20 individual layers.

If films obtainable only by an inconvenient additional treatment or by the time-consuming method of cathodic sputtering are eliminated, there remain only very few substances which lend themselves to the production by known processes of films which are adherent, resistant, highly refractive and substantially free of absorption. Among the compounds which, to be sure, can be vaporized at very high temperatures, and which yield substantially absorption-free condensates, are the rare earth oxides, in particular, cerium oxide, probably due to the very strong bond between oxygen and cerium.

It has been indicated in the literature that by vaporizing silicon in vacuo in an atmosphere of residual oxygen, transparent films of high refractive index can be obtained which, however, even in a film thickness which produces a mirror with maximum reflection of 60% ($\lambda/4$) show an absorption of 8% of the light falling on the mirror. Since 40% of the incident light penetrates the film, 60% being reflected, this means that a full fifth or 20% is absorbed per individual film. In the frequently used film thickness of $\lambda/2$, the absorption of the light which penetrates the films constitutes nearly double this amount (36%). It is clear that systems containing several of such strongly absorbing films soon are practically non-transparent, so that these proposals do not solve the problem of obtaining useful absorption-free thin films for optical purposes.

It is accordingly an object of the present invention to provide a process by means of which chemically and mechanically resistant, practically absorption-free, light-transparent, thin films from saturated metallic compounds can be obtained without the above-described disadvantages. The process of the invention comprises vaporizing metallic compounds, or mixtures of metals and metallic compounds, in vacuo, under an initial pressure leading to a substantial decrease in the hardness of the films, with subsequent condensation of the obtained vapors upon bases, preferably glass, and as characterized by the feature that the condensation is carried out in an atmosphere enriched with a compound-forming gas in contrast to an atmosphere such as is obtained by evacuating a vaporizer originally filled with air. Through this artificial enrichment with the compound-forming gas, it is possible—provided, however, that metallic compounds or mixtures of metallic compounds and metals, or a metal alone, are used as starting substances—to produce absorption-free films from saturated compounds, despite the fact that a high vacuum prevails in the vaporizer, because of which it had previously been assumed that an unavoidable disproportioning would have to result, which it was believed could not be eliminated if hard, strongly adherent films were to be obtained.

The term "metal" as used throughout the specification and claims of this case is meant to include silicon which, although in the true sense is a non-metal, does in many ways act and react like a metal.

The process of the invention will now be further illustrated by means of the following examples, without, however, limiting the scope of the invention as defined in the appended claims.

If $TiO_2$, which can be vaporized from an electrically heated tungsten vessel at about 2200° C., in a high vacuum such as is obtained by evacuating the air from a vaporizer to a pressure of $1.10^{-5}$ mm. Hg or less, is condensed on a transparent base, films are obtained which at the frequently employed thickness of $\lambda/2$ of the average wavelength of visible light (5500 A.) show an absorption of 5 to 10% insofar as the vaporization time amounts to less than 10 minutes. Such films are naturally unsuitable for the production of as absorption-free as possible reflection-reducing coatings, multi-layer interference films, and the like. The absorption can be somewhat reduced by prolonging the vaporization or by vaporizing under a higher pressure, but this is, however, not economically feasible; and in addition the obtained films are no longer sufficiently resistant or fast to rubbing. Moreover, when using hitherto known evaporation processes on numerous substances, it is not at all possible to obtain the desired balance between the required mechanical properties on the one hand, and the requirement of freedom from absorption on the other.

If, however, in accordance with the invention, Ti, $TiO_2$—or another titanium-oxygen compound—is evaporated to form a saturated $TiO_2$ film in an atmosphere enriched with oxygen, hard $TiO_2$ films are obtained in only a few minutes which have very little and practically no absorption. Ten or twenty such films together have no more absorption than a single film obtained by vaporizing in a high vacuum in the hitherto used processes in which the residual atmosphere consists principally of a mixture of nitrogen, oxygen and hydrocarbons, the latter being derived from the pump operating fluid and from the packing means. Preferably, pure oxygen is used in the process of the invention for enriching the atmosphere, a pressure of about $6.10^{-5}$ mm. Hg being satisfactory. The pressure data are, however, intended to serve as indication data. The exact optimum pressure depends on the average free path, on the distance between the evaporation apparatus and the base to be coated, on the nature of the reactants and possibly on still other factors. These are in any case easily ascertained by preliminary experiment with any particular apparatus.

In the process of the present invention, one operates below the pressure which would lead to a considerable reduction in the hardness of the films. It is particularly advantageous that this pressure limit in an atmosphere enriched with a compound-forming gas, is shifted by a factor of 10 from about $1.10^{-5}$ to $1.10^{-4}$ mm. Hg (depending on the apparatus). This permits the use as starting materials of unsaturated compounds which occasionally are easier to vaporize. In this connection, it is particularly advantageous to use as starting materials mixtures of metal and metallic oxides, e.g., a mixture of Ti and $TiO_2$, the melting point of which is considerably lower than the melting point of either Ti or $TiO_2$ taken separately, and which can therefore be vaporized more easily.

Similar considerations apply to SiO. It has already been proposed to produce protective layers on mirror surfaces and the like by vaporizing $SiO_2$. If this, however, is attempted in known ways, absorbent films are always obtained with a light yellow tinge, due to a fraction of SiO or Si in the condensate. It has been proposed to transform such films by the use of the known processes, into absorption-free $SiO_2$ films by treatment with high pressure steam or by a treatment at high temperatures. Such treatments are, however, quite troublesome and often the films and the bases do not admit of such rigorous treatment. If, however, $SiO_2$, or Si preferably a mixture of $SiO_2$ and Si, is treated in accordance with the present process in an atmosphere enriched with oxygen, for example, in oxygen under a pressure of some $5.10^{-5}$ mm. Hg, films practically free from absorption are obtained. For the production of absorbent films, which consist essentially of sub-oxides, it is known to use starting materials which contain in addition also metals and other oxides. However, using the process of the present invention, the condensate is practically free from absorption also when the starting material contains metals.

Similar phenomena could in general be established as the result of further investigations. Metallic compounds which, in the hitherto employed vaporization process produce films of considerably higher absorption than would be expected from the film thickness and the known absorption properties of the film material in massive condition, can now be condensed, in accordance with the invention, to give films of minimum absorption. Especially thoroughly investigated were the compounds of iron, zirconium, aluminum, and zinc, in addition to compounds already described. The same results as for oxygen apply also for other gases; for example, nitrogen. Of course, only those compounds are to be expected which can be produced also otherwise between metals and starting substances which are gaseous at usual room temperatures.

The further investigations led to the determination of the following details:

If the quantity of the compound-forming gas introduced into the vaporization chamber is too small, then absorption will first of all result. Should a preliminary trial for producing a certain film show that absorption still occurs, this can be compensated by prolonging the vaporization time. One can, however, by shifting the above-mentioned pressure limit in accordance with the invention, also enrich the atmosphere more greatly with the compound-forming gas, and absorption-free and nevertheless hard films will be obtained. Generally, it is found advantageous to use an atmosphere which consists at least of half of the compound-forming gas, such as oxygen. Advantageously, a pressure higher than $3.10^{-5}$ mm. Hg is used. In carrying out the process of the invention, the air contained in the evaporation chambers before evacuation can be displaced by the compound-forming gas and the evacuation then performed, or evacuation can first be performed to a pressure lower than the vaporizing pressure, and then the compound-forming gas introduced, with simultaneous increase of the pressure. In some cases it has proved advantageous to carry out the vaporizing in a stream of gas, the stream being given a definite direction; for example, toward the material to be vaporized, or on the vaporizing apparatus, whereby in many cases a further improvement in the process is obtained for example, still faster vaporization. One can also, as is known in processes for carrying out chemical reactions in gas chambers at higher pressures, e.g., in cathode sputtering, ionize the compound-forming gas prior to contact with the substances to be condensed. This permits the formation of absorption-free, hard films even at a low degree of enrichment and at very low pressures, much lower than are possible in cathode sputtering.

The introduction of the compound-forming gas into the evaporation apparatus can be effected through needle-valves, such as have long been used for the introduction of oxygen in cathode sputtering apparatus. The installation of a vaporization apparatus for carrying out the process of the invention will thus not require any additional devices and can be set up in a very short time.

In addition to the above discussed advantages of the substantial saving of time and the possibility of forming the films without heating the carriers or bases, the process of the invention presents still further advantages. In the known processes involving the chemical after-treatment of deposited metallic films by tempering in a suitable compound-forming atmosphere, the film undergoes an alteration in thickness. This is undesirable in the manufacture of interference films which have a very exactly prescribed thickness of the individual films, since it is very difficult to control accurately the film in the after-treatment. While this is possible in a single film and reflection-reducing films have been prepared in this way, such procedure is virtually impossible in a multi-layer system of say twenty-five films, especially since it is undesirable to resort to simultaneous heating of the films because of the risk of alloy formation, so that always only the uppermost film at any time is carefully converted into the desired compound. However, during the conversion of each uppermost film in turn, for example, during the tempering in an oxidizing atmosphere, not only this uppermost film is altered, but also every already treated film underneath undergoes a further change in thickness. In contradistinction thereto, the process of the invention produces at once the correct film thickness, which can be easily measured by known methods during the evaporation.

The invention will be further described by reference to the accompanying drawing, in which.

Figure 1:
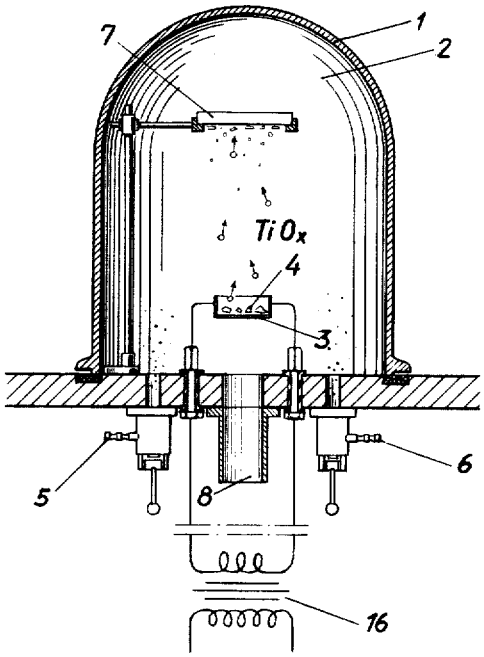
FIG. 1 shows in schematical representation an installation which shall make it possible to manufacture coating films of sufficient hardness and having the property of being practically absorption free from titanium oxides being saturated to a maximum extent with oxygen.

In FIGURE 1 the numeral 1 designates the container which environs the vaporization space 2 which is to be evacuated. In the vaporization space 2 is located the vaporization source 3 which, for instance, in the shape of a little vessel made of heavy melting metals, such as wolfram, molybdenum and the like, contains the initial substance 4. The initial substance 4 will be heated electrically (heating transformer 16) and vaporized in this manner. The numeral 8 designates the suction socket for connection of an evacuation pump. Furthermore, there are represented gas feeding pipes 5, 6, etc., through which the gas can be led in which shall be used for manufacture of coatings of metal compounds on a carrier 7, and which are most saturated with this gas. Preferably oxygen is taken as a basis of the following consideration, as especially metal oxides have the properties on which the manufacture of thin coating films in particular depends, however, without nitrides, fluorides, sulphides, and other metal-gas compounds being excluded.

If one assumes that as initial substance $TiO_2$ is in the little vessel 3, the $TiO_2$ dissociates in the space 2 and becomes free of oxygen which, however, because of maintaining a vacuum in the space 2 will be sucked off immediately. In the statistic average value therefore exists the vapour cloud which forms, above the little vessel 3, of pure titanium atoms, molecules of the sub-oxide TiO, and fully saturated molecules of the compound $TiO_2$ which corresponds to the stoichiometric proportion. If reference is not had to the single atom or molecule but to the average statistic condition of the vapour cloud, then consequently the chemical condition of the gas phase can be designated by the formula $TiO_x$. In this case the magnitude of $x$ lies between the values 2 and 0 (zero), but in any case is smaller than 2. If now through the pipes 5, 6 oxygen molecules $O_2$ are blown into the vapour cloud, collisions occur where the $TiO_x$ molecules and those of $O_2$ collide with one another. If the colliding molecules have the same direction and possess approximately the same velocity, their thermic energy is approximately concurrent. Thereby, in contrast to common lattice combination the affinity between the molecules of $TiO_x$ and $O_2$ comes to full effect, the arising condition of equilibrium is no more because of the high thermic energy of the $TiO_2$ displaced toward the Ti-side, but is much more displaced from the $TiO_x$-side to that of the $TiO_2$.

In FIGURE 1 is has been represented schematically how the $TiO_x$ and $O_2$ molecules move off in the vacuum space 2 from the vaporation source 3. It can be seen that the $TiO_2$ molecules lose oxygen on the high vaporization temperature and according to the statisic average value convert into $TiO_x$. If, however, $TiO_x$ and $O_2$ molecules coincide in the evacuation space 2 and during consideration, the thermic condition corresponds to a dissociation pressure of oxygen at low temperatures. Therewith it is made understood that the compound $TiO_2$ is the more stable one.

Figure 2:
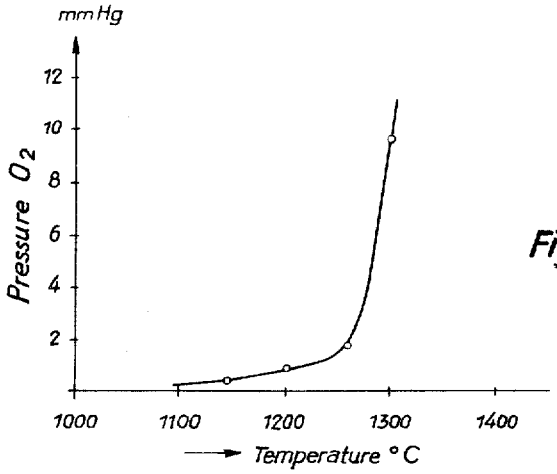
FIG. 2 represents the dissociation pressure of iron oxide ($Fe_2O_3$) depending on the temperature.

FIGURE 2 shows the same conditions more exactly by means of graphical represented coherence between the dissociation pressure of the oxygen in mm. Hg for $Fe_2O_3$ drawn as ordinate and the temperature drawn as abscissae. If one assumes that as initial substance there is $Fe_2O_3$ in the little vessel 3 of the FIGURE 1, a dissociation occurs according to the following equation:

$$6Fe_2O_3 \rightleftharpoons 4Fe_3O_4 + O_2$$

whereas with increasing temperature the equation reads from the left to the right. If however, the pressure in the receiver is below the pressure of dissociation, the stage of oxidation $Fe_3O_4$ also can no more remain in existence but also this iron oxide will be decomposed to the next stage of oxidation, where the decomposition occurs according to the equation:

$$2Fe_3O_4 \rightleftharpoons 6FeO + O_2$$

Naturally also this stage of oxidation cannot remain stable, if the pressure in the evacuation space is smaller than the pressure of dissociation, i.e., a further decomposition of the FeO takes place according to the formula:

$$2FeO \rightleftharpoons Fe_2 + O_2$$

Each time, when the compound of low valency occurs, the function shows a perceptible discontinuity. The FeO linkage is essentially stronger at the same temperature as the linkage $Fe_2O_3$. If the oxygen of $Fe_2O_3$. is decomposed until the compound FeO is formed, then the pressure of dissociation is essentially lower at same temperature. It is to be attributed to these phenomena that it is not possible to precipitate metal compounds being fully saturated, with oxygen onto the carrier 7 according to FIGURE 1 even not, if oxides of highest valency are vaporized in the little vessel 3, but in general only precipitates of sub-oxides, respectively of the metal itself can be realized.

Therewith it becomes evident subsequently that by introduction of oxygen through the pipes 5, 6 the represented conditions pertaining to the production of a condensation product consisting of iron oxide having highest valency can be changed fundamentally.

The procedure leading to the invention, however, is not based only on the perceptions represented by the FIGURES 1 and 2, but is based on further perceptions which have been represented by graphic method in the FIGURES 3 to 6.

Figure 3:
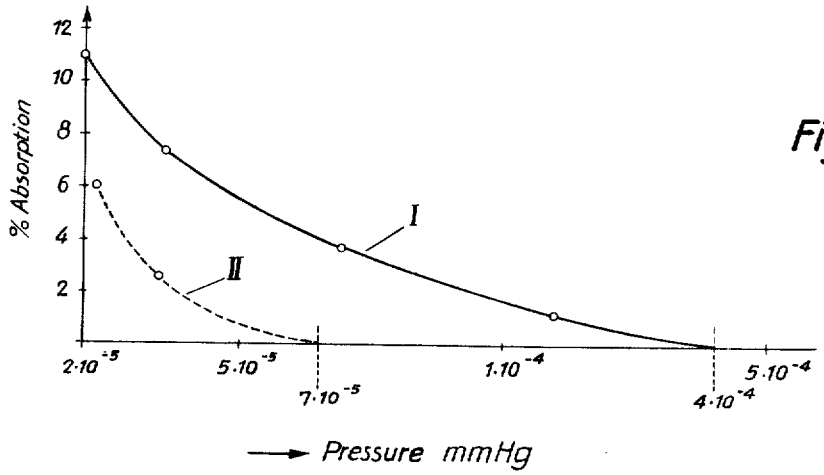
FIG. 3 represents for the titanium oxide ($TiO_2$) the coherence between absorption and pressure while different flow directions for vapour and gas are taken into account.

If the absorption of the condensation products for the substance $TiO_2$ is drawn dependent on the pressure, there results a characteristic course of the curves I and II in FIGURE 3 showing that at determined pressures being available in the evacuation space 2 the absorption reaches the 0 (zero)-value. Below these limiting pressures, the absorption increases more considerably. Consequently, that means that one must work above these limiting pressures in order to obtain substances having a low absorption degree or being practically absorption free.

Figure 4:
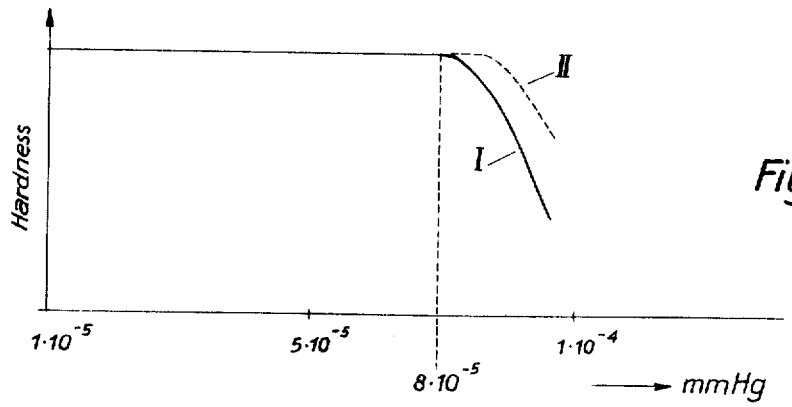
FIG. 4 shows for the same substance the coherence between hardness and pressure dependent on the flow conditions.
Figure 5:
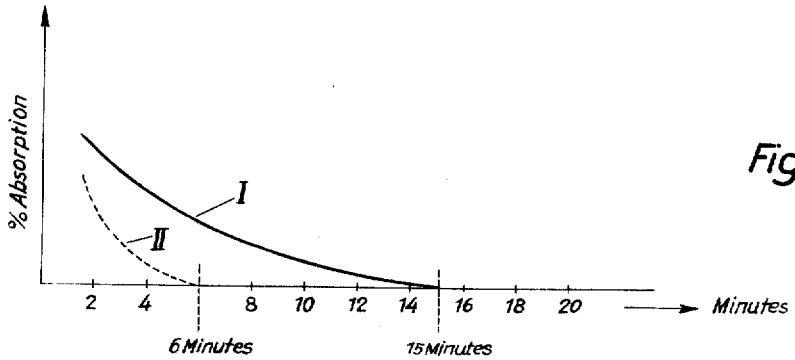
FIG. 5 represents the coherence between absorption and evaporation time for $TiO_2$ dependent on different flow conditions.

If now one considers the hardness of the condensation films produced, again depending on the ruling pressure in the evacuation space 2, so the conditions relating to this can be seen from FIGURE 4. This figure shows that from certain limiting pressures on, which are different from those as represented in FIGURE 3 and in particular being higher than the limiting pressure of the curve II according to FIGURE 3, an extraordinary surprising and rapid decrease of the hardness occurs. If it is thus desired to obtain hard films, i.e. mechanically and generally combined therewith also chemically resistant precipitation films, one must work below these higher limiting pressures, i.e., a clearly determined area of intermediate pressure occurs in the FIGURES 3 and 4 which is characterized on the one hand by the manufactured condensation films being practically absorption free and possessing a high degree of hardness on the other. Beyond these two pressure areas one obtains either hard films with high absorption capacity or such being practically absorption free but having soft or loose, anyhow, not sufficient hard structure. As exact experiments have proved, this perception is generally valid, so that it could be established as a rule for industrial working from the moment on when this perception was made.

It has already been directed to it above that as well the curve I as also the curve II show the same characteristic course without any cause existing to enter in particulars of the differences which are shown by these curves in comparison with each other. For, according to additional perception it is not immaterial in which manner the gas which shall be used for maximal saturation of the metal gas compound to be manufactured, is admitted to the vapour stream. There is first of all the possibility to give the same flow direction to the gas and to the vapour. This means an increase of the probability of coincidence of the molecules coming into question, i.e. the conditions represented must improve. The curves II in the FIGURES 3 and 4 correspond to this flow condition. These curves show according to the expectation an enlargement of the pressure area lying between them, where with the adjustment of this pressure area hard as well as absorption free condensation products are obtained. Such a favourable intermediate pressure does not arise with the curves I which correspond to a flow condition under which the gas and the vapour flow in opposite directions to one another.

Nevertheless, one can also work according to the curves I, because the dependence of the curves according to the FIGURES 3 and 4 on the flow condition shows that the time is of considerable influence. For, the mean sojourn time, during which a molecule of the admitted gas flow is such close to a molecule of the substance to be deposited in the vapour stream that a reaction can take place, is longer with the process II than with the process I. Therefore, the evaporation time which has been taken as a basis for the FIGURES 3 and 4 with a duration of 4 min., has been introduced into the FIGURES 3 and 4 as hithereto not expressively mentioned parameter. In order to make the influence of the evaporation time immediately recognizable, FIGURE 5 has been represented, where reference is had to a constant pressure of oxygen of $7.10^{-5}$ mm. Hg and to a constant film thickness of $$\frac{\lambda}{4.n}$$

where $\lambda$ may correspond to the wave length of the maximal eye sensitivity, consequently may correspond to a wave length of 5500 m$\mu$ (millimicron). In this case the influence of the flow direction can in especially clear manner be recognized. While according to the process I an evaporation time of 15 min. is required in order to obtain coating substances being free of absorption, only 6 min. are required with the process II.

Figure 6:
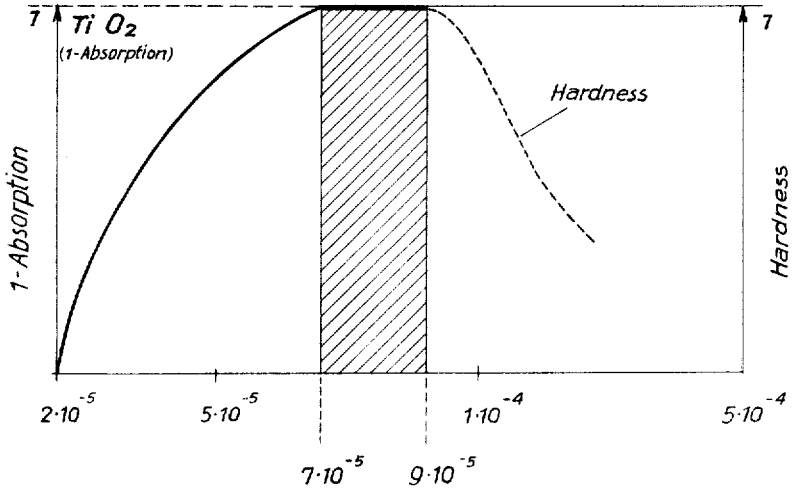
FIG. 6 shows a characteristical representation by means of which the coherence between absorption and hardness on the one hand, and that between absorption and pressure on the other can be recognized.

FIGURE 6 shows the conditions in one single figure which have been represented in the FIGURES 3 and 4 separately, in order to mark off more exactly the area of intermediate pressure proposed according to the invention, within which the represented successful results can be realized, towards the pressure areas within which working would be without practical success. The expression: (1—absorption) as well as also the hardness has been drawn as ordinates whereas the maximum absorption and the maximum hardness in each case shall correspond to the value 1. The curve fully drawn out corresponds in each case to the value (1—absorption), and the dashed curve corresponds to the hardness. There, where both curves overlap, the section of the curve which corresponds to a determined range of intermediate pressure has been drawn as fat line. The part of the diagram lying beneath this joint curve section has been emphasized by shadowing, so that on the abscissae axis the limiting pressures can be recognized. If the process is carried out under observing these limiting pressures, thus with pressures lying within the range of intermediate pressures which has been emphasized this way in the drawing, one obtains the deposition of films which combine the properties of being practically absorption free and having great hardness. In all other pressure ranges lying outside of this narrow range of intermediate pressures, the properties of the film manufactured lead either in optical or in mechanical respect to disadvantages or even to unserviceability of the film. It has already been mentioned that characteristic curves according to FIGURE 6 can be determined for all substances examined. Thus, absorption free films consisting of $SiO_2$, $ZrO_2$, $TiO_2$, $Al_2O_3$, ZnO, $SnO_2$ and other oxides could be obtained. Also with compounds, such as $Fe_2O_3$ which show still absorption capacity, the chemical pure stage of oxidation being of highest valency could be produced according to this process. It is notable in this case that the evaporations could be carried out without causing temperature increases worth mentioning of the carriers or fundamentals.

Figure 7:
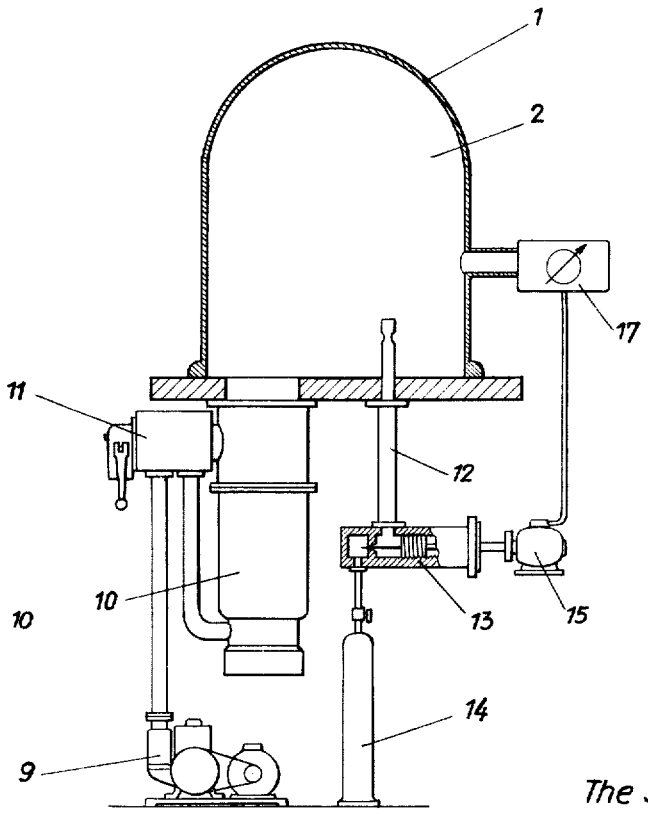
FIG. 7 shows in schematical representation the means for automatic control of the pressure in the vaporization space.
Figure 8:
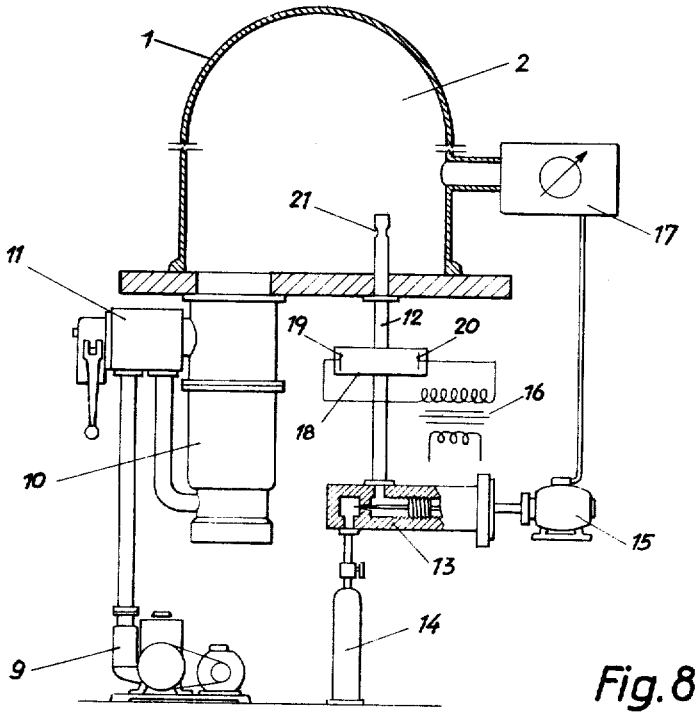
FIG. 8 shows an installation adapted for ionization of the gas to be supplied by means of a gas discharge.

The FIGURES 7 and 8 show installations in schematical representation which have been designed according to example. A special design was necessary therefore, since, because of the fluctuations occurring in the main circuit, voltage and amperage of the current may be different. As the critical range of intermediate pressure is very narrow within which high quality properties of the condensation products are obtainable only, the gas pressure must be kept entirely constant. Since, however, the evaporation speed in its turn depends on the current conditions explained, the mentioned quantities of gas must be proportioned exactly in order to prevent that a variation in the gas pressures occurs. For this purpose, according to FIGURE 7 a gas admission 12 is assigned to the evacuation space 2 which will be evacuated by means of pump arrangement consisting of a pre-vacuum pump 9, a diffusion pump 10 and a valve box 11. The cross section of the gas admission pipe will be opened more or less by means of a needle valve 13. A source 14 for supplying gas, not represented in the drawing, for instance, a gasometer or a gas generator is arranged in front of the needle valve 13. The needle valve 13 which opens more or less the throttling cross section is under the influence of a servo-motor 15. The servo-motor in its turn again is put under the influence of a vacuum gauge 17 which is in the position to measure the pressure existing in the space 2. Expediently the vacuum gauge is designed as a gas discharge manometer, so that with rising pressure in the high vacuum space 2 the gas discharge current increases. By means of this increasing current the equilibrium of a Wheatstone bridge which has been adjusted to the nominal value of the vacuum is disturbed. Since the servo-motor 15 is connected in the balancing branch of this resistance bridge, it will be supplied with current, i.e. the servo-motor comes into action. The direction of rotation is determined this way that in such a case the needle valve throttles the gas feeding cross section 12 more than before. Thereby, the pressure available in the space 2 decreases, i.e., it approximates to the nominal pressure, and the throttling is maintained until the nominal pressure is reached. In case of a decrease of the pressure in the space 2 the same procedure takes place in reverse sense. In this manner the pressure of the space 2 can be fully kept constant during any time desired, so that the critical range of intermediate pressure, within which the high quality properties of coating films to be produced are obtained, is maintained.

Figure 9:
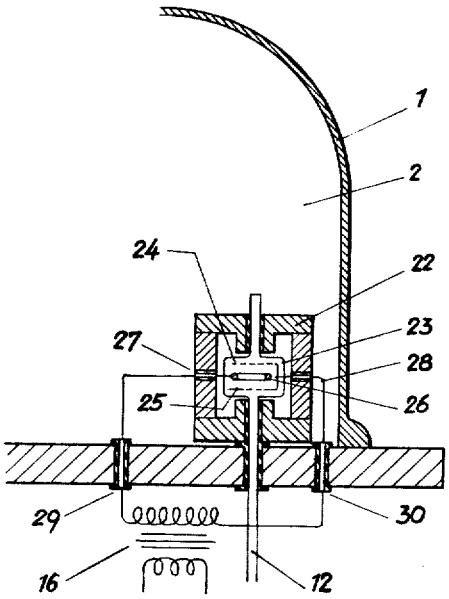
FIG. 9 shows a further installation for ionization of the gas to be supplied by means of a gas discharge in a magnetic field.

In order to increase the capacity of reaction between metal compounds and gas supplied in the evacuation space 2, there still exists the possibility to ionize this gas, for example, before or during the introduction into the evacuated space. This can be done thereby, that according to the propositions made in FIGURE 8 an ionization chamber 18 is inserted into the pipeline 12. This ionization chamber has two electrodes 19, 20 to which a tension of several thousand volts is applied which is generated by means of the transformer 16. On a gas pressure in the space 18 which is between $1.10^{-1}$ and $5.10^{-3}$ mm. Hg with corresponding distance of the electrodes there results a gas discharge in which gas molecules are farmost ionized. In order to secure that in the space 2 itself the suitable formation of the intermediate pressure is not disturbed, the ionized molecules are led into the space 2 through a throttling member 21 which may be designed as capillary tube. Another possibility consists therein that an ionization chamber with a magnetic field is arranged at the exit opening of the nozzle through which the gas is supplied into the evacuated space. This is shown in FIGURE 9. Therein designates 22 a screened type electro magnet in the magnetic field of which a glass body 23 containing electrodes is located. The magnetic field is designed this way that the gas molecules to be ionized through electrodes being arranged in helical or in spiral paths in the magnetic field because of their great free length of path will also be ionized on pressures being less than $5.10^{-3}$ mm. Hg. The electrodes can, for instance, consist of two net shaped cold cathodes 24 and 25 between which a ring shaped anode is arranged in this manner that the lines of force of the magnetic field will intersect vertically the ring plane. The numerals 27 and 28 designate the current supply lines to the electrodes which are led out in vacuum tight manner at the points 29 and 30 and being connected to the transformer 16. The gas to be supplied streams through the supply pipe 12 at first into the space 23, there it will be ionized by the gas discharge and is then led into the evacuation space. The process can be applied without difficulties on pressures up to $1.10^{-5}$ mm. Hg. Ionized gas leads to the advantage that the affinity between the gas ion and the metal compound is, because of the free valency forces of the ion, essentially greater than with the molecule itself. Thereby the probability becomes essentially greater that in consequence of a collision of the compound with the ion the possible maximum saturation with the gas, i.e. the appropriate formation of the compound occurs.

What is claimed is:

1. Process for the deposition of mechanically and chemically resistant, substantially absorption-free light-transparent thin films composed substantially completely of a saturated metallic compound on a carrier, which comprises enriching the atmosphere of a vaporization chamber with a reactive gas [which forms a compound with the free metal at the temperature of vaporization,] whereby said reactive gas is contained in substantially higher proportion than in the normal atmosphere, vaporizing [at least] a substance selected from the group consisting of [(1) a vaporizable metal adapted to form a saturated compound] *a vaporizable metal compound,* the thin film of which is mechanically and chemically resistant, substantially absorption-free and light-transparent [, (2) a vaporizable compound of such metal, and (3) a mixture of such compound with the free metal, said substance including at least a portion of (2) or (3)] *and a mixture of such compound with vaporizable free metal of the type in the compound* in the enriched atmosphere and under a reduced pressure below that which leads to a substantial decrease in the hardness of the film, and effecting the condensation of the thus formed vapor on the carrier, thereby forming a thin film of substantially completely saturated metallic compound on said carrier.

2. Process according to claim 1, wherein the carrier is transparent glass.

3. Process for the deposition of mechanically and chemically resistant, substantially absorption-free, light-transparent thin films of a saturated metallic compound on a carrier, which comprises vaporizing [at least] a material selected from the group consisting of [a vaporizable metal adapted to form a saturated compound] *a vaporizable metal oxide,* the thin film of which is mechanically and chemically resistant, substantially absorption-free and light-transparent, [an oxide of such metal and mixtures of such metal with its oxide] *and a mixture of such metal oxide with a vaporizable free metal capable of forming such metal oxide* under a reduced pressure below that which leads to a substantial decrease in the handness of the film and in an atmosphere enriched with oxygen, [said material including at least a portion of an oxide of such metal and mixtures of such metal] and effecting the condensation of the vapor of the vaporized material on the carrier.

4. Process according to claim 3, wherein the vaporization is conducted in an atmosphere at least half of which is composed of oxygen.

5. Process according to claim 3, wherein the vaporization is conducted at a pressure above $3.10^{-5}$ mm. Hg.

6. Process according to claim 3, wherein the carrier is maintained at approximately room temperature.

7. Process according to claim 3, including the steps of initially displacing the air in the vaporization space with oxygen, and then evacuating such space.

8. Process according to claim 3, wherein the vaporization space is first evacuated to a pressure below that at which the vaporization is to be conducted, and then introducing oxygen into such space until the vaporization pressure is reached.

9. Process according to claim 3, wherein a stream of oxygen is maintained in the vaporization space during the vaporization.

10. Process according to claim 3, wherein the oxygen is ionized prior to contact with the vaporized material.

11. Process according to claim 3, wherein the metal oxide and metal are silicon oxide and silicon, and wherein the vaporization is conducted in the atmosphere enriched with oxygen at a pressure of about $5.10^{-5}$ mm. Hg.

12. Process according to claim 3, wherein the metal and its oxide are titanium and a titanium oxide, and wherein the vaporization is conducted in the atmosphere enriched with oxygen at a pressure of about $6.10^{-5}$ mm. Hg.

References Cited

The following references, cited by the Examiner, are of record in the patented file of this patent or the original patent.

UNITED STATES PATENTS

| | | | |
|---|---|---|---|
| 2,077,442 | 4/1937 | Tedham et al. | 117—107 X |
| 2,411,715 | 11/1946 | Dimmick | 118—49 |
| 2,411,955 | 12/1946 | Colbert et al. | 350—166 X |
| 2,430,452 | 11/1947 | Colbert et al. | 117—106 X |
| 2,440,105 | 4/1948 | Land et al. | 350—153 |
| 2,450,850 | 10/1948 | Colbert et al. | 117—107 X |
| 2,466,119 | 4/1949 | Moulton et al. | 350—164 |
| 2,478,385 | 8/1949 | Gaiser | 350—164 |
| 2,539,149 | 1/1951 | Miller | 117—107 X |
| 2,549,926 | 4/1951 | Pride et al. | 117—107 X |
| 2,578,956 | 12/1951 | Weinrich | 117—106 X |
| 2,784,115 | 3/1957 | Brinsmaid et al | 117—106 |
| 2,920,002 | 1/1960 | Auwarter | 117—33.3 |

WILLIAM D. MARTIN, Primary Examiner

M. R. P. PERRONE, Jr., Assistant Examiner

U.S. Cl. X.R.

117—35, 106, 107, 107.2; 204—192, 298; 350—164